(12) United States Patent
Yoshida

(10) Patent No.: US 6,178,026 B1
(45) Date of Patent: Jan. 23, 2001

(54) ANALOG OPTICAL TRANSMISSION APPARATUS

(75) Inventor: Toshiro Yoshida, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/087,464

(22) Filed: May 29, 1998

(30) Foreign Application Priority Data

Jun. 2, 1997 (JP) ............................................. 9-144109

(51) Int. Cl.$^7$ ....................................................... G02B 5/32
(52) U.S. Cl. ........................................ 359/187; 359/180
(58) Field of Search ........................... 359/180, 181, 359/187, 188, 189, 194

(56) References Cited

U.S. PATENT DOCUMENTS

| | | | |
|---|---|---|---|
| 4,344,173 | 8/1982 | Straus | 372/38 |
| 4,611,352 | * 9/1986 | Fujito et al. | 455/609 |
| 5,003,546 | 3/1991 | Lidgard et al. | 372/26 |
| 5,012,475 | 4/1991 | Campbell | 372/29 |
| 5,034,334 | 7/1991 | Flynn et al. | 437/8 |
| 5,068,863 | 11/1991 | Fulton | 372/31 |
| 5,077,619 | 12/1991 | Toms | 359/187 |
| 5,161,044 | * 11/1992 | Nazarathy et al. | 359/157 |
| 5,243,613 | 9/1993 | Gysel et al. | 372/26 |
| 5,257,124 | 10/1993 | Glaab et al. | 359/124 |
| 5,680,238 | * 10/1997 | Masuda | 359/132 |
| 5,745,275 | * 4/1998 | Giles et al. | 359/187 |
| 5,850,305 | * 12/1998 | Pidgeon | 359/187 |

FOREIGN PATENT DOCUMENTS

| | | |
|---|---|---|
| 56-4948 | 1/1981 | (JP) . |
| 59-36446 | 2/1984 | (JP) . |
| 59-207756 | 11/1984 | (JP) . |
| 4-69988 | 3/1992 | (JP) . |
| 5-167161 | 7/1993 | (JP) . |
| 5-275782 | 10/1993 | (JP) . |
| 5-299775 | 11/1993 | (JP) . |

* cited by examiner

Primary Examiner—Jason Chan
Assistant Examiner—Sanjay Patel
(74) Attorney, Agent, or Firm—Ostrolenk, Faber, Gerb & Soffen, LLP

(57) ABSTRACT

An analog optical transmission apparatus includes a semiconductor laser module, a bandpass filter, a distortion level detection circuit, a control signal generation circuit, and a distortion erasure circuit. The semiconductor laser module includes a semiconductor laser for converting a multi-carrier analog signal into an optical signal and outputting the optical signal and a light-receiving element for receiving the optical signal from the semiconductor laser and converting the optical signal into an electrical signal. The bandpass filter extracts only a specific distortion component from the electrical signal output from the light-receiving element. The distortion level detection circuit detects a level of the distortion component output from the bandpass filter. The control signal generation circuit generates a control signal corresponding to the distortion component level output from the distortion level detection circuit. The distortion erasure circuit generates a distortion signal having the same level and phase as those of a distortion from the semiconductor laser on the basis of the control signal from the control signal generation circuit and cancels the distortion from the semiconductor laser using the generated distortion signal.

6 Claims, 2 Drawing Sheets

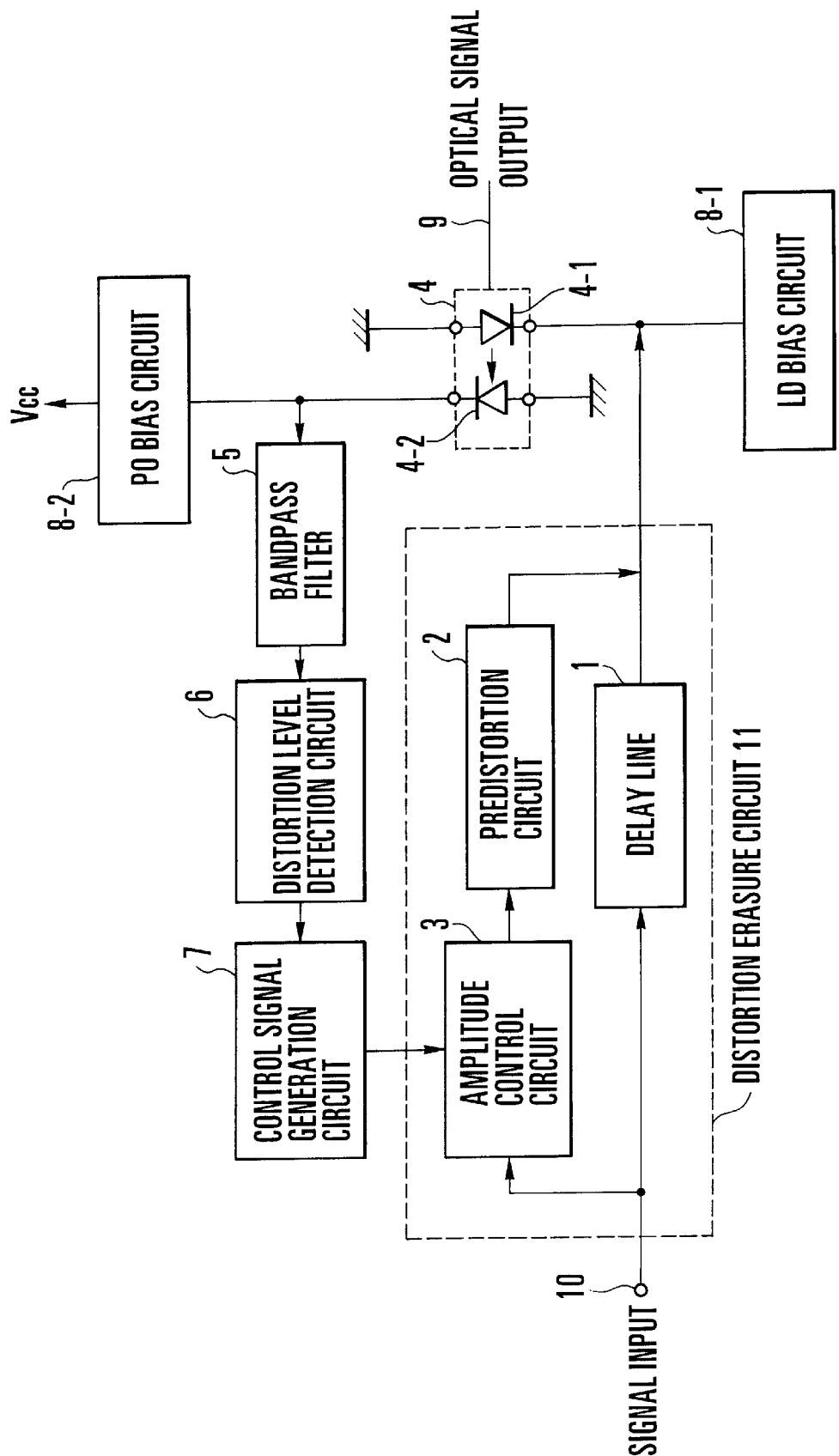
F I G. 1

ANALOG OPTICAL TRANSMISSION APPARATUS

BACKGROUND OF THE INVENTION

The present invention relates to an analog optical transmission apparatus for optical fiber communication and, more particularly, to an analog optical transmission apparatus suitable for SCM (Sub Carrier Multiplex) transfer.

In a CATV (CAble TeleVision) system or the like, an SCM scheme is used for data transfer. When data transfer based on the SCM scheme is used for optical transfer, an intermodulation distortion due to the nonlinearity of the I-L (current vs. optical output) characteristics of a semiconductor laser often poses a problem.

An analog optical transmission apparatus having a function of compensating for such an intermodulation distortion is disclosed in Japanese Patent Laid-Open No. 5-27582 (reference 1).

FIG. 2 shows the schematic arrangement of the analog optical transmission apparatus disclosed in reference 1. Referring to FIG. 2, reference numeral 11 denotes an analog signal source; 12, a semiconductor laser connected to the analog signal source 11; 13, an optical fiber for transmitting an optical signal output from the semiconductor laser 12; 14, an optical fiber coupler optically coupled to the optical fiber 13; 15, a light-receiving element for receiving the output light from the optical fiber coupler and converting the light into an electrical signal; 16, an amplifier for amplifying the output signal from the light-receiving element 15; 17, a delay line for delaying the output from the analog signal source; and 18, a differential amplifier for differentially amplifying the output from the amplifier 16 and the output from the analog signal source 11 through the delay line.

The semiconductor laser 12 is intensity-modulated by the analog signal source 11 and outputs an optical signal to the optical fiber 13. At this time, part of the optical signal passing through the optical fiber 13 is extracted by the optical fiber coupler 14. The optical signal extracted by the optical fiber coupler 14 is converted into an electrical signal by the light-receiving element 15. The electrical signal converted by the light-receiving element 15 contains an intermodulation distortion (cross modulation distortion) generated by the semiconductor laser 12. The electrical signal containing the distortion component is amplified by the amplifier 16 and input to the first input terminal of the differential amplifier 18. The signal from the analog signal source 11 is input to the second input terminal of the differential amplifier 18 through the delay line 17.

When the amplitude and phase of the signal output from the analog signal source 11 match those of the signal output from the light-receiving element 15, the carrier wave (carrier) contained in the signal is canceled as a common mode signal of the differential amplifier 18, so only the distortion component is extracted. At this time, the delay line 17 adjusts the phase of the signal output from the analog signal source 11 and the phase of the signal output from the light-receiving element 15 such that the two phases match. The signal corresponding to only the distortion component, which is output from the differential amplifier 18, is superposed on the signal to be output from the analog signal source 11 to the semiconductor laser 12. When the amplitude and phase of the distortion generated by the semiconductor laser 12 are inverted to those of the distortion component output from the differential amplifier 18, the distortion can be canceled.

However, in the conventional analog optical transmission apparatus, distortion compensation in a broadband is impossible in principle. More specifically, in the analog optical transmission apparatus shown in FIG. 2, the light emitted by the semiconductor laser 12 is monitored by the optical fiber coupler 14 inserted midway in the optical fiber 13 and by the light-receiving element 15. The distortion component generated by the semiconductor laser 12, which is detected upon monitoring, is superposed on the signal from the analog signal source 11 to the semiconductor laser 12. At this time, a time lag occurs between the timing when the distortion is generated by the semiconductor laser 12 and the timing when the distortion component is superposed on the signal output from the analog signal source 11 to the semiconductor laser 12. That is, the phases of the distortion components cannot be made to match in principle. In this case, the distortion cannot be compensated for in a broadband.

SUMMARY OF THE INVENTION

It is an object of the present invention to provide an analog optical transmission apparatus capable of compensating for a distortion in a broadband.

It is another object of the present invention to provide an analog optical transmission apparatus capable of obtaining a stable distortion compensation effect independently of a change in ambient temperature and a change over time.

In order to achieve the above objects, according to the present invention, there is provided an analog optical transmission apparatus comprising a semiconductor laser module including a semiconductor laser for converting a multi-carrier analog signal into an optical signal and outputting the optical signal and a light-receiving element for receiving the optical signal from the semiconductor laser and converting the optical signal into an electrical signal, filter means for extracting only a specific distortion component from the electrical signal output from the light-receiving element, distortion level detection means for detecting a level of the distortion component output from the filter means, control signal generation means for generating a control signal corresponding to the distortion component level output from the distortion level detection means, and distortion erasure means for generating a distortion signal having the same level and phase as those of a distortion from the semiconductor laser on the basis of the control signal from the control signal generation means and canceling the distortion from the semiconductor laser using the generated distortion signal.

BRIEF DESCRIPTION OF THE DRAWINGS

FIG. 1 is a block diagram showing the schematic arrangement of an analog optical transmission apparatus according to an embodiment of the present invention.

DESCRIPTION OF THE PREFERRED EMBODIMENT

Figure 2:
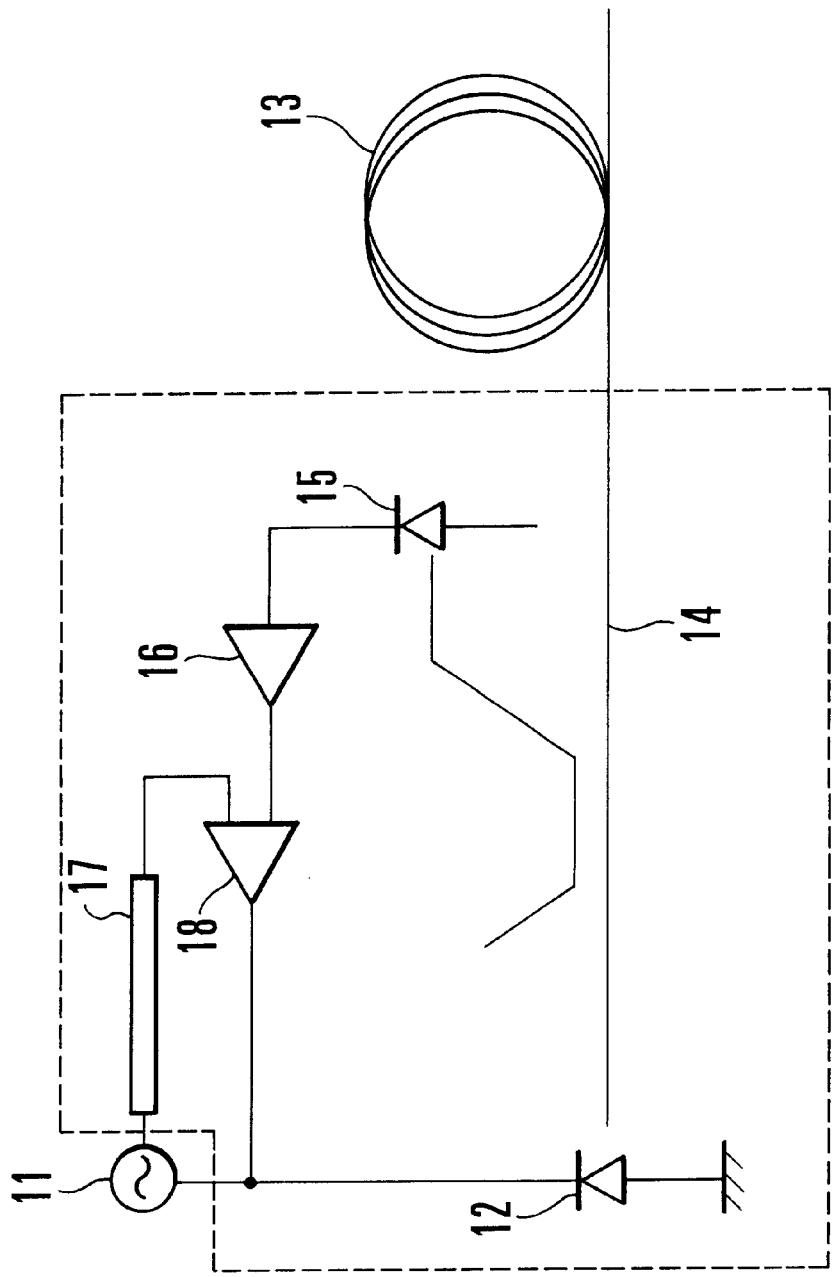
FIG. 2 is a view showing the schematic arrangement of a conventional analog optical transmission apparatus.

The present invention will be described below in detail with reference to the accompanying drawings.

FIG. 1 shows the schematic arrangement of an analog optical transmission apparatus according to an embodiment of the present invention. Referring to FIG. 1, reference numeral 1 denotes a delay line for delaying an input signal; 2, a predistortion circuit for generating a predetermined distortion signal; and 3, an amplitude control circuit for controlling the amplitude of the input signal on the basis of a control signal. The delay line 1, the predistortion circuit 2, and the amplitude control circuit 3 constitute a distortion erasure circuit 11.

Reference numeral 4 denotes a semiconductor laser module (to be referred to as an LD module hereinafter) incorporating a semiconductor laser 4-1 for converting an input signal received through the delay line 1 into an optical signal and a light-receiving element 4-2 consisting of a pin photodiode (PIN-PD) optically coupled to the semiconductor laser 4-1.

Reference numeral 5 denotes a bandpass filter for extracting a specific distortion component from the output from the light-receiving element 4-2; 6, a distortion level detection circuit for detecting the distortion level of the output from the bandpass filter 5; 7, a control signal generation circuit for outputting a control signal to the amplitude control circuit 3 on the basis of the output from the distortion level detection circuit 6; 8-1, an LD bias circuit for supplying a DC bias to the semiconductor laser 4-1; 8-2, a PD bias circuit for supplying a DC bias to the light-receiving element 4-2; 9, an optical fiber for transmitting an optical signal emitted by the semiconductor laser 4-1; and 10, a signal input terminal to which a multi-carrier analog signal is input.

A multi-carrier analog signal input to the signal input terminal 10 is demultiplexed to two components and sent to the amplitude control circuit 3 and the delay line 1. The semiconductor laser 4-1 incorporated in the LD module 4 is intensity-modulated by the analog signal passing through the delay line 1 and outputs an optical signal. The optical signal output from the semiconductor laser 4-1 contains an intermodulation distortion due to the nonlinearity. This signal light is partially received by the light-receiving element 4-2 incorporated in the LD module 4.

The signal output from the light-receiving element 4-2 contains not only the carrier component but also a distortion component generated by the semiconductor laser 4-1. The signal containing the distortion component is sent from the light-receiving element 4-2 to the bandpass filter 5. The bandpass filter 5 extracts only a specific distortion component and outputs it to the distortion level detection circuit 6. The distortion level detection circuit 6 detects the level of the distortion component output from the bandpass filter 5 and outputs the detected level to the control signal generation circuit 7.

The control signal generation circuit 7 compares the distortion component level output from the distortion level detection circuit 6 with a predetermined reference level and outputs a control signal to the amplitude control circuit 3 in accordance with the comparison result. On the basis of the control signal output from the control signal generation circuit 7, the amplitude control circuit 3 controls the amplitude of the analog signal branching from the signal input terminal 10 and outputs the amplitude-controlled analog signal to the predistortion circuit 2.

The predistortion circuit 2 generates an intermodulation distortion corresponding to the level of the signal output from the amplitude control circuit 3. At this time, the distortion signal from the predistortion circuit 2 is controlled by the amplitude control circuit 3 to obtain the same level and phase as those of the distortion generated by the semiconductor laser 4-1. At the start of operation, the predistortion circuit 2 generates a distortion component expected to be generated by the semiconductor laser 4-1.

The distortion signal output from the predistortion circuit 2 is superposed on the analog signal from the delay line 1 to the semiconductor laser 4-1. In this case, the analog signal on which the distortion signal from the predistortion circuit 2 is to be superposed is delayed by the delay line 1 such that the phase of the distortion generated by the semiconductor laser 4-1 is inverted to that of the distortion generated by the predistortion circuit 2. With this arrangement, the distortion is compensated for by the feedback system while monitoring the distortion compensation result from the predistortion circuit 2 such that the level of the signal output from the distortion level detection circuit 6 is always minimized, i.e., the distortion generated by the semiconductor laser 4-1 is always canceled by the distortion signal from the predistortion circuit 2.

As has been described above, according to the present invention, control is performed to always minimize the distortion while monitoring the distortion compensation result from the predistortion circuit 2, so distortion compensation in a broadband is enabled. In addition, a stable distortion compensation result can be obtained independently of a change in ambient temperature and a change over time.

What is claimed is:

1. An analog optical transmission apparatus comprising:
   a semiconductor laser module including a semiconductor laser for converting a multi-carrier analog signal into an optical signal and outputting the optical signal and a light-receiving element for receiving the optical signal from said semiconductor laser and converting the optical signal into an electrical signal;
   filter means for extracting only a specific distortion component from the electrical signal output from said light-receiving element;
   distortion level detection means for detecting a level of the distortion component output from said filter means;
   control signal generation means for generating a control signal corresponding to the distortion component level output from said distortion level detection means; and
   distortion erasure means for generating a distortion signal having the same level and phase as those of a distortion from said semiconductor laser on the basis of the control signal from said control signal generation means and canceling the distortion from the semiconductor laser using the generated distortion signal.

2. An apparatus according to claim 1, wherein said distortion erasure means comprises
   amplitude control means for receiving a demultiplexed signal of the analog signal to be supplied to said semiconductor laser and controlling an amplitude of the demultiplexed signal on the basis of the control signal from said control signal generation means,
   delay means for delaying the analog signal to be supplied to said semiconductor laser, and
   predistortion means for generating a distortion signal having the same level and phase as those of the distortion from said semiconductor laser in accordance with a level of the amplitude-controlled signal from said amplitude control means and superposing the distortion signal on the delayed analog signal output from said delay means so that the distortion generated by said semiconductor laser is canceled by the distortion signal output from said predistortion means.

3. An apparatus according to claim 1, wherein said semiconductor laser is directly intensity-modulated by the analog signal.

4. An apparatus according to claim 1, wherein said filter means comprises a bandpass filter.

5. An apparatus according to claim 1, wherein said light-receiving element is optically coupled to said semiconductor laser in said semiconductor laser module.

6. An analog optical transmission apparatus comprising:

a semiconductor laser module including a semiconductor laser directly intensity-modulated by a multi-carrier analog signal to output an optical signal and a light-receiving element for receiving the optical signal from said semiconductor laser and converting the optical signal into an electrical signal;

a bandpass filter for extracting only a specific distortion component from the electrical signal output from said light-receiving element;

a distortion level detection circuit for detecting a level of the distortion component output from said bandpass filter;

a control signal generation circuit for generating a control signal corresponding to the distortion component level output from said distortion level detection circuit;

an amplitude control circuit for receiving a demultiplexed signal of the analog signal to be supplied to said semiconductor laser and controlling an amplitude of the demultiplexed signal on the basis of the control signal from said control signal generation circuit;

a delay circuit for delaying the analog signal to be supplied to said semiconductor laser; and a predistortion circuit for generating a distortion signal having the same level and phase as those of a distortion from said semiconductor laser in accordance with a level of the amplitude-controlled signal from said amplitude control circuit and superposing the distortion signal on the delayed analog signal output from said delay circuit so that the distortion generated by said semiconductor laser is canceled by the distortion signal output from said predistortion circuit.

* * * * *